May 21, 1963 W. S. MOORE 3,090,095
METHOD OF AND APPARATUS FOR EMBALMING
Filed Jan. 13, 1960 2 Sheets-Sheet 1
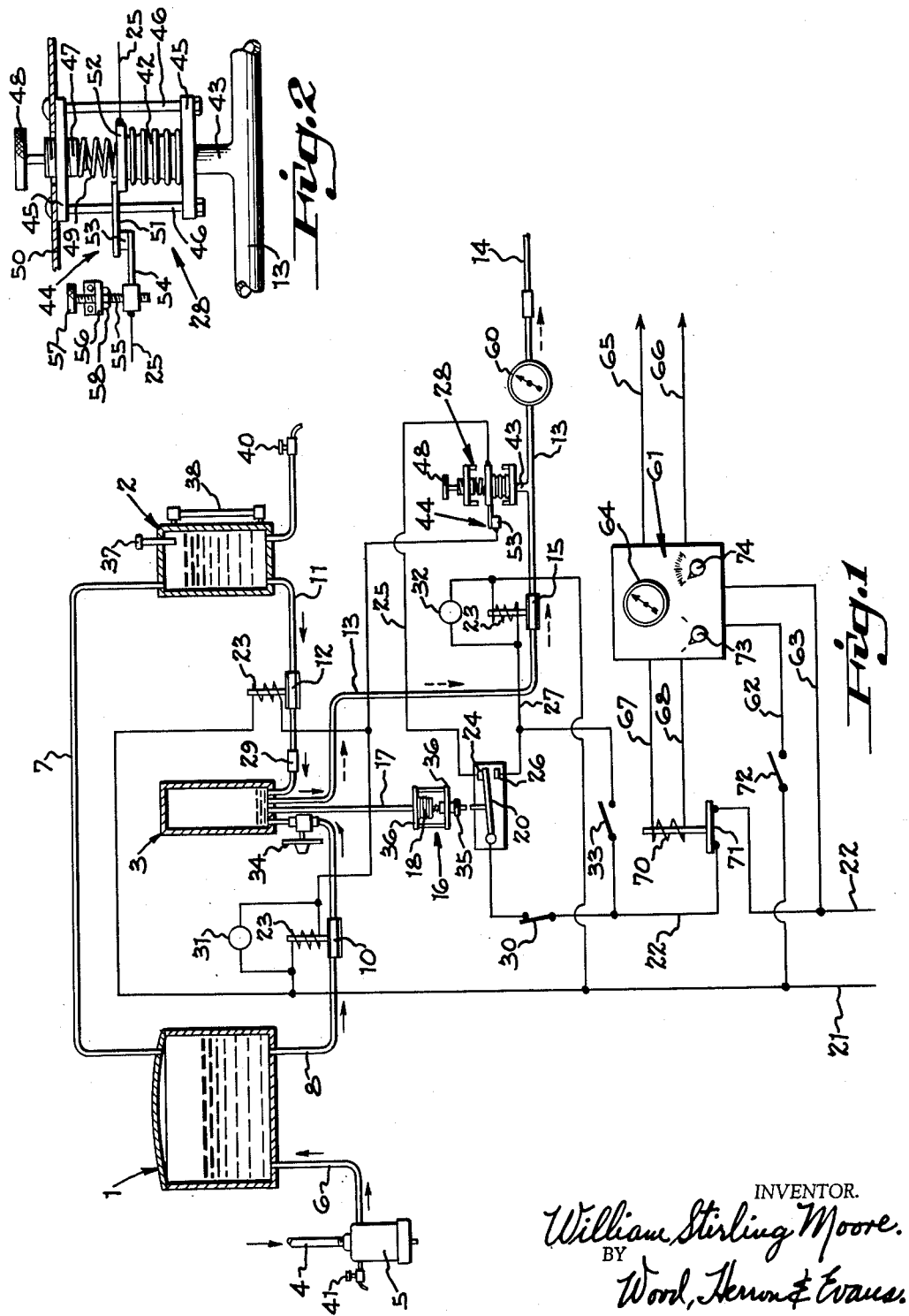
INVENTOR.
William Stirling Moore.
BY
Wood, Herron & Evans.
ATTORNEYS.

May 21, 1963 W. S. MOORE 3,090,095
METHOD OF AND APPARATUS FOR EMBALMING
Filed Jan. 13, 1960 2 Sheets-Sheet 2
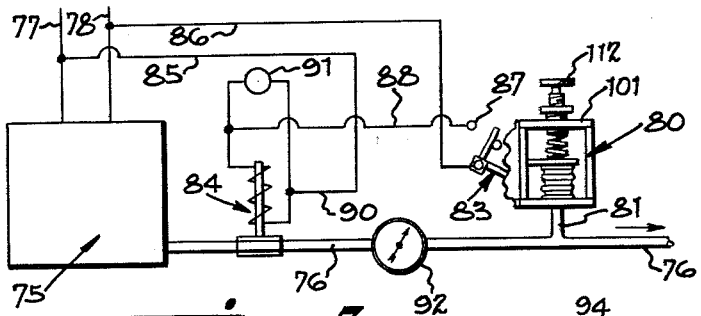
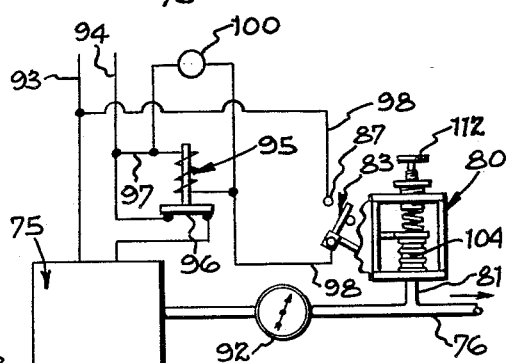
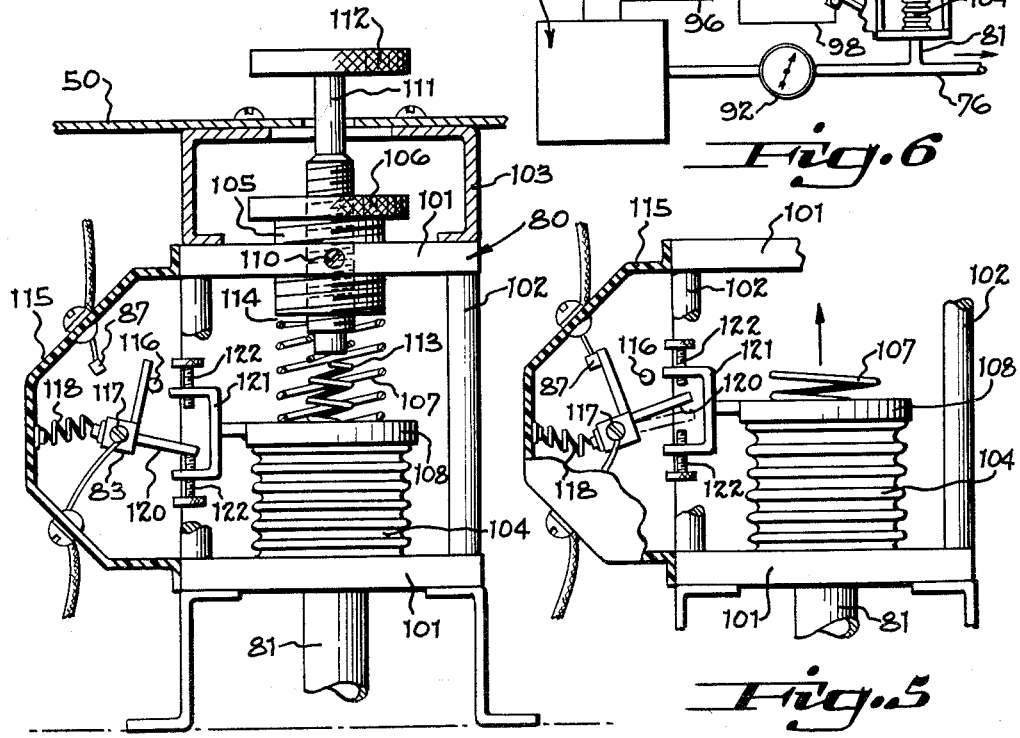
INVENTOR.
William Stirling Moore.
BY
Wood, Herron & Evans
ATTORNEYS.

United States Patent Office 3,090,095
Patented May 21, 1963

3,090,095
METHOD OF AND APPARATUS FOR EMBALMING
William Stirling Moore, Spring St., Batavia, Ohio
Filed Jan. 13, 1960, Ser. No. 2,234
2 Claims. (Cl. 27—22)

This invention relates to the art of embalming and involves method and apparatus aspects, both relating to an improved technique wherein a mixture of embalming fluid and water is injected under controlled back pressure into the circulatory system.

One of the primary objectives of the present invention has been to provide a simple, reliable apparatus which delivers the solution of embalming liquid either in the form of a continuous stream under variable pressure or as a pulsating stream, and wherein the maximum pressure of each pulsation is determined by back pressure within the circulatory system, thereby to prevent damage to the body due to excessive injection pressures.

The present apparatus involves an improvement over the embalming apparatus disclosed in my prior patent, No. 2,626,466, which is arranged to inject the embalming solution in the form of a pulsating flow stream and at a controlled rate of flow, the water and concentrate being mixed in proper proportion and injected into the body as fast as it is mixed. According to this apparatus, the rate of flow may be varied conveniently to suit the particular conditions prevailing in any individual case. Moreover, since the solution is mixed at the time of the injection, the solution strength can be varied at any time during the embalming operation.

The technique of embalming, as practiced for a great many years, consists essentially of injecting the embalming fluid under pressure into the larger arteries, for example the carotid, for distribution throughout the circulatory system, while drainage takes place through the venous system. If the process is carried out properly, the treating fluid reaches and acts upon practically all parts of the body. However, care must be exercised throughout the operation because swelling can occur very rapidly due to pressure which develops should an obstruction be present at some point in the body.

According to the embalming apparatus of the aforesaid patent, the fluid is injected either as a continuous stream under variable pressure, but preferably as a pulsating stream in order to overcome the problem of complete fluid distribution. The intermittent application of pressure apparently causes dilation of the blood vessels, such that the pressure of one impulse is dissipated gradually before the next impulse reestablishes the pressure.

According to the present improvement, the pulsations of embalming fluid are made responsive to predetermined maximum and a predetermined minimum back pressure within the circulatory system, the arrangement being such that the apparatus injects periodically when the pressure falls below the minimum setting of the apparatus. During the first portion of an embalming operation, the apparatus provides a pulsating flow according to the normal operation of the patented apparatus. After this initial stage, the improved apparatus immediately reacts to back pressure in the circulatory system to block off the flow until the pressure build-up in the body dissipates to a preselected safe value before the next injecting surge takes place. By operating in response to back pressure in this manner, complete control of pressure and rate of flow are maintained automatically. In the event of blockage in the system, the apparatus simply slows down or stops injecting until the situation is remedied; therefore, the danger of swelling completely is eliminated.

A further advantage of the invention arises from the fact that, under back pressure control, the apparatus may inject very rapidly so as to completely fill the circulatory system with solution in the shortest possible time. In other words, under normal operating conditions with proper drainage, little or no back pressure is created during the initial injection period; hence, the solution may be injected safely at a much faster rate than is possible with the conventional apparatus, with elimination of discoloration and the quick establishment of more complete circulation, as well as a decided increase in embalming speed and an improvement in the over-all result.

In general, the invention involves the use of a pressure responsive switch in communication with the injection conduit which conveys the solution to the body, the switch being located at some point between the body and the embalming apparatus. The pressure responsive switch is arranged to stop the flow of solution when the back pressure in the injecting conduit reaches a desired maximum and minimum value, for example, a maximum back pressure of six or more pounds p.s.i. and a minimum of a few ounces up to three or four pounds p.s.i. After each surge, the pressure falls gradually as the solution is absorbed by the tissues; drainage from the body also contributes to the gradual decrease in pressure. When the back pressure drops to a predetermined minimum pressure, the pressure responsive switch creates another injection surge, the surges creating a pulse which is similar to the natural heart action. The surges of solution are thus sustained continuously, the frequency rate of the surges being governed by back pressure conditions prevailing in each individual case.

A further objective has been to provide an apparatus which is adapted to perform the embalming operation and to decommission the apparatus in an automatic manner when the process is completed.

It has been determined that the electrical resistance of the tissues decreases as the embalming solution acts upon them, and this principle is utilized in controlling the apparatus. According to this aspect of the invention, an electrical control system is utilized in conjunction with the embalming apparatus. The electrical system includes electrodes which are placed in contact at spaced points with the body, the arrangement being such that a weak current is caused to flow across the electrodes and through the tissues during the embalming operation. The electrical circuit is arranged to amplify and measure the current, which varies as embalming progresses, and to stop the embalming apparatus when the resistance drops to a point, as determined by the setting of the control system. The present apparatus therefore eliminates the danger of swelling and damage during the embalming operation and also decommissions the apparatus at completion of the process, thereby providing substantially automatic operation.

It is also contemplated, as explained later, to utilize the principles of this invention in conjunction with various type of embalming machines other than the structure disclosed in the aforesaid patent.

The various features and advantages of the invention will be more fully apparent to those skilled in the art from the following detailed description taken in conjunction with the drawings.

In the drawings:

FIGURE 1 is a diagrammatic view illustrating the embalming apparatus of my prior patent, No. 2,626,446, with the back pressure control elements of the present invention incorporated therein.

FIGURE 2 is an enlarged fragmentary side elevation, illustrating the pressure responsive switch which regulates the embalming apparatus in response to back pressure within the circulatory system.

FIGURE 3 is a diagrammatic view illustrating a modified arrangement, wherein the back pressure control apparatus is incorporated in a conventional embalming machine.

FIGURE 4 is an enlarged fragmentary side view, partially in section, detailing a pressure responsive switch for adapting the conventional embalming apparatus to back pressure control.

FIGURE 5 is a fragmentary view similar to FIGURE 4, showing the pressure responsive switch tripped to its second position.

FIGURE 6 is a diagrammatic view similar to FIGURE 3, showing another circuit for controlling the conventional embalming machine with the present back pressure apparatus.

*Embalming Machine*

The embalming apparatus disclosed in FIGURE 1 is similar to that shown in my prior patent, and has been modified to operate in response to back pressure as described later in detail. In addition, the circuit has been altered to provide automatic control of the embalming apparatus, taking advantage of changes in electrical resistance which take place as the embalming fluid acts upon the tissues.

In general, the embalming apparatus comprises a water reservoir 1, a concentrate reservoir 2, and a mixing chamber 3. As explained below in detail, a fresh water supply is confined in the water reservoir 1, a supply of concentrated embalming fluid is confined in the concentrate reservoir 2 and metered quantities of water and concentrate pass from the reservoirs to the mixing chamber 3 to be injected into the body during operation of the machine. The reservoirs and mixing chamber are made of plastic and are mounted upon a cabinet (not shown) which contains the electrical components which control the operation.

When the machine is in operation, fresh water is supplied under pressure by way of a service line 4 to a pressure regulator 5 which is arranged to bypass a portion of the water and to supply the residue at reduced pressure to the water reservoir 1 by way of the conduit 6. Since the details of the pressure regulator 5 do not form a part of the present invention, the structural details have been omitted. It will be understood that the present regulator may be adjusted to provide the required water pressure, such that it bypasses water under high pressure from line 4 and maintains a fixed back pressure for example, 18 to 20 pounds p.s.i. in the supply line 6 and reservoir 1. The water reservoir 1 is a closed vessel such that air is trapped in its upper portion above the water level to provide a head pressure which remains substantially constant. Therefore, water from the reservoir can be passed through a metering valve to be measured accurately as it is advanced to the mixing chamber 3.

The concentrate tank 2 which contains the concentrated embalming fluid, is maintained under the same head pressure as the water reservoir, as indicated diagrammatically by the conduit 7. In actual practice, the reservoirs are physically nested one within the other, the concentrate tank having an opening, such that the air pressure is common to the water and concentrate. This makes it possible to provide a metered flow from the concentrate reservoir which is properly proportioned to the metered flow streams from the water reservoir.

Water is advanced from the reservoir to the mixing chamber by way of conduit 8, which includes a solenoid valve 10 for regulating the flow, as explained later. The concentrate from the reservoir 2 is advanced to the mixing chamber by way of a conduit 11 which includes a second solenoid valve 12 for regulating the flow. These valves are normally closed and are opened only when their coils are energized.

From the mixing tank, the embalming solution is discharged by way of the conduit 13, which leads to the injection tube 14. The outer end of this tube includes a suitable instrument for insertion into the circulatory system. The conduit 13 includes a third solenoid valve 15 which controls the flow of embalming solution from the mixing chamber 3. This valve is also of the normally closed type, which opens when energized.

The mixing chamber 3 comprises a closed vessel, the arrangement being such that a head pressure is generated within the chamber in accordance with the flow of fluid under pressure from the water and concentrate reservoirs. The operation of the solenoid valves 10, 12 and 15 is determined by a pressure responsive switch 16 which is in communication with the mixing chamber by way of a conduit 17. In general, the pressure responsive switch comprises a bellows 18 and a switch pole 20, operatively connected with the bellows, the arrangement being such that the bellows expands as pressure is developed in the mixing chamber, causing the switch pole 20 to be shifted from the mixing position, as shown in FIGURE 1, to a discharge position, as explained below.

During operation, current is supplied to the electrical system by way of the power lines 21 and 22. As shown in FIGURE 1, the line 21 is connected by way of branch lines to one side of the respective coils 23 of the solenoid valves 10, 12 and 15. The opposite side of the circuit is completed by way of the second power line 22, through the upper contact 24 of pressure responsive switch 20, and branch lines 25 to the solenoid valves 10 and 12. In the position shown therefor, the coils 23 of valves 10 and 12 are energized, so as to open the valves, adapting the water and concentrate to flow to the mixing tank, as indicated by the arrows in full lines. When the predetermined amount of water and concentrate is forced through the metering valves and into the mixing chamber, the pressure in the chamber expands the bellows 18, thus shifting the switch pole 20 to its second position engaging the lower contact 26, which completes a circuit by way of line 27 to the coil 23 of the discharge valve 15. Pole 20 thus deenergizes the coils of supply valves 10 and 12, to close the valves, and energizes the coil of the discharge valve 15 to open it. Under normal operation of the apparatus, as disclosed in the aforesaid patent, the fluid under pressure is then discharged from chamber 3, through conduit 13 and tube 14 into the circulatory system, as indicated by the arrows in broken lines.

However, according to the present improvement, a back pressure switch, indicated at 28, is inserted in the electrical system for back pressure control. In the position shown in FIGURE 1, the back pressure switch 28 is in its closed position. So long as switch 28 remains closed, the apparatus functions as disclosed in my prior patent. The action of the embalming machine in response to the back pressure apparatus will be described later.

The embalming operation is started by closing the main power switch 30, which completes the circuit to the main pressure responsive switch 20. It will be noted that the control circuit includes indicating lamps 31 and 32 in shunt with the coils of supply solenoids 10 and 15 to indicate the operation of the machine. The pulsating discharge is brought about by alternate operation of the supply and discharge valves 10, 12 and 15. When the supply valves 10 and 12 are open, the lamp 31 will be energized, indicating that the mixing action is taking place. When the pole of switch 20 shifts to its second position at completion of the mixing operation to close the supply valves and open the discharge valve 15, then the indicating lamp 32 will be energized.

If the apparatus is to be operated at constant delivery, a manual switch 33, which is in shunt with the pressure responsive switch 16, may be closed, thereby to hold the discharge valve 15 open. When the circuit is thus conditioned, the supply valves 10 and 12 will open intermittently, as explained above, under control of the pressure responsive switch 16 or 28 whichever has the lower setting. As noted earlier, the water and concentrate reservoirs are maintained under pressure of approximately 18 to 20 pounds p.s.i.; hence, the water and concentrate is fed to the mixing chamber under sufficient pressure to actuate the pressure responsive switch for proper mixing, even though the discharge valve 15 remains open.

Under normal pulsating operation, the pressure responsive switch 16 will hold the supply valves 10 and 12 in open position until the predetermined pressure is developed in the mixing chamber; at this point, the switch trips to close the supply valves and open discharge valve 15. When switch 33 is closed for continuous discharge, the switch 28 controls the mixing cycles.

Since the reservoirs 1 and 2 are under the same pressure, the flow from the respective tanks can be accurately controlled by interposing flow metering valves in the conduits 8 and 11. In order to meter the flow through conduit 11, there is provided a fixed metering valve 29 in the conduit, downstream from the supply valve 12. A variable metering or mixing valve 34 is interposed in the conduit 8 leading from the water reservoir. The fixed valve 29 thus permits a measured quantity of concentrate to pass into the chamber 3 in a given time period, while the adjustable valve 34 permits a measured quantity of water to pass into the chamber. The variable metering valve 34 is provided with a calibrated dial which provides direct reading of the percentage of concentrate and water. As disclosed in the patent, the variable metering valve 34 is mounted within the cabinet of the machine, with the graduated dials located at the front panel for convenient manipulation while the apparatus is in operation.

The pressure responsive switch 16 is also mounted within the cabinet and includes an adjustment screw 35 threaded through the frame 36 which encloses the bellows 18. The adjustment screw 35 acts against a compression spring having its opposite end seated against the lower end of the bellows to vary the flexibility of the bellows and thereby regulate the discharge pressure of the embalming solution.

The concentrate reservoir 2 is provided with a filler tube 37 which preferably extends through the top wall of the cabinet for convenience in adding concentrate to the apparatus. A liquid level gauge 38 communicates with the concentrate reservoir and is visible through a window formed in the cabinet. The concentrate reservoir includes a drain cock 40, and the water pressure regulator includes a similar drain cock, indicated at 41. If the apparatus is not to be reused after completion of an operation, the water and concentrate remaining in the reservoirs is drained by way of the valves 40 and 41.

Back Pressure Apparatus

As indicated earlier, the back pressure switch 28 of the present improvement is interconnected in the electrical circuit and is arranged to regulate the embalming apparatus in accordance with the back pressure existing in the circulatory system during the embalming operation. As detailed in FIGURE 2, the back pressure switch 28 comprises an expansible bellows 42 in communication as at 43 with the delivery conduit 13 and arranged to operate a switch 44. The switch 44 is inserted in the branch line 25 which extends from the upper contact 24 of the pressure responsive switch 16. As explained in detail later, the bellows 42 opens the switch 44 and thus deenergizes the circuit to one side of the coils 23 of the solenoid supply valves 10 and 12. Accordingly, when the back pressure rises beyond a predetermined limit, the back pressure switch 28 prevents the supply valves from opening and thereby decommissions the embalming apparatus until the back pressure falls to a safe level.

Described in detail (FIGURE 2) the back pressure switch 28 comprises spaced mounting plates 45 connected together by spacers 46, forming a cage for the bellows 42. One end of the bellows is sealed with respect to the plate 45, and the branch conduit 43 passes through the plate and communicates with the bellows. An adjustment screw 47, having a knurled head 48, is threaded through the opposite plate 45, and a compression spring 49 is interposed between the free end of the bellows and the screw 47. The cage is mounted with respect to the panel 50 of the embalming machine, such that the knurled head 48 is presented to the operator.

The switch, indicated generally at 44 (FIGURE 2) comprises a blade 51 attached to the end plate 52 of the bellows and adapted to engage a contact 53 mounted upon an arm 54. The arm 54 is mounted upon an adjustment screw 55 which is threaded through a bracket 56 mounted in a stationary position, preferably within the cabinet. The adjusting screw includes a knurled head 57 and is locked in its adjusted position by a nut 58. In initially setting up the machine, the contact adjustment screw 55 is regulated to provide closing of the switch at a minimum back pressure in the discharge conduit 13, and the bellows adjustment screw 47 is regulated to provide closing of the switch at the desired minimum back pressure, as shown, on the pressure gauge 60.

Operation

At the start of the embalming operation, very little flow resistance is offered; accordingly, the switch 44 of the back pressure valve remains closed. The embalming appartus operates to alternately mix and inject the fluid by way of the discharge conduit 13, thus providing the pulsating action and injecting the fluid as rapidly as drainage is obtained. Accordingly, the apparatus completely fills the circulatory system to expose the tissues to the action of the solution as fast as possible. After the initial rapid injection period, a certain amount of back pressure begins to build up; however, so long as the back pressure is below the safe limit for which the switch 28 is set, the normal pulsating action (created by the embalming machine) is sustained. When back pressure increases beyond the setting of the back pressure switch 28, the expanding bellows 42 will overcome the action of spring 49, thereby to open contact 53 and deenergize the circuit leading to the supply valves 10 and 12. These valves will then remain closed until the back pressure is dissipated. At this point, the bellows 42 contracts sufficiently to close the contact 53, thus opening the supply valves 10 and 12 for the next mixing cycle and injecting cycle.

It will be understood that the back pressure limits vary in accordance with the point of injection. By way of example, in injecting through the carotid artery, a maximum of setting of adjustment screw 47, in the neighborhood of one pound p.s.i. may provide rapid injection with no danger of swelling. When injecting at points more remote, a higher back pressure may be utilized, as determined by each individual case.

In order to provide an indication of back pressure conditions, a pressure gauge 60 preferably is inserted in the delivery line 13. This gauge comprises a conventional pressure indicating instrument, preferably reading directly in pressure per square inch.

As shown diagrammatically in FIGURE 1, the apparatus is provided with an electrical sensing circuit adapted to pass a weak current of electricity through the body during the embalming process. This circuit is arranged to indicate the degree of preservation and also to shut down the entire apparatus when embalming is completed. The sensing circuit is based upon the principle that the electrical resistance of the tissues decreases as the embalming progresses.

Described generally, the sensing circuit, as indicated in block form at 61 is powered by alternating current by way of the branch lines 62 and 63, and includes an indicating meter 64. The circuit 61 includes a transformer arranged to provide a low voltage circuit, together with a suitable rectifier for direct current operation. The low voltage, direct current is transmitted by way of lines 65 and 66 to respective probes or electrodes which are in contact with the body at spaced points. The sensing circuit includes a suitable amplifying circuit which energizes the branch lines 67 and 68 leading to a relay 70. Relay 70 includes a contactor 71 inserted in the main power line 22. A manual control switch 72 is inserted in the branch line 62 for placing the sensing apparatus in operation. In order to protect the meter 64, the circuit preferably includes a second switch, indicated diagrammatically at 73, which places the meter temporarily in circuit with the lines 65 and 66 for reading purposes. The sensing circuit further includes a variable resistor for setting up the proper values in accordance with operating conditions. The variable resistor is regulated by a control knob indicated at 74.

During the embalming operation, the selector switch may be shifted to a position interconnecting the meter 64 in the circuit. The meter indicates the relative dryness of the tissue, as reflected by the change in electrical resistance, and thus indicates the degree to which embalming has progressed. At the predetermined setting of the variable resistor, the change in resistance triggers the amplifying circuit so as to energize the relay 70, causing its contactor 71 to open the circuit and thereby to decommission the embalming apparatus in an automatic manner.

Modified Arrangement

The apparatus disclosed in FIGURE 3 illustrates a conventional embalming machine converted to back pressure operation, utilizing back pressure switch of modified construction (FIGURES 4 and 5) and an electrical valve interconnected with the injection conduit. For simplicity, the conventional embalming machine is indicated diagrammatically at 75, having an injection conduit 76 leading to an injection instrument. In the present example, the machine is powered by the electrical lines 77 and 78. A conventional machine of this character includes pumping apparatus adapted to force the embalming fluid through the injection line at a selected pressure, either under continuous flow, or in some cases, with a pulsating flow. In the operation of these machines, an obstruction in the circulatory system will cause trouble, since the machine continues to operate at its fixed pressure until it is manually readjusted or shut down.

In order to provide back pressure control, a back pressure switch asembly, indicated generally at 80 is in communication as at 81 with the injection conduit 76. The back pressure switch 80 includes a toggle pole, indicated generally at 83, which is interconnected with an electrical valve 84. The valve 84 is normally open and is closed when its coil is energized. The back pressure apparatus includes branch lines 85 and 86 for energizing the valve 84 through the back pressure switch 80. The back pressure switch 80 is described later with reference to FIGURES 4 and 5.

In the low pressure position (FIGURES 3 and 4) the valve 84 is open and the embalming solution is flowing through the conduit 76 as indicated by the arrow. When the back pressure rises above the setting of the back pressure switch 80, then the switch pole 83 is shifted to its second position, as shown in FIGURE 5. The circuit is thus completed from line 86, pole 83, contact 87, line 88 to the coil of valve 84. The circuit is completed through the coil by way of line 90 to branch line 85, thereby to shut off the flow of embalming fluid. When the back pressure falls to a safe level, the back pressure switch will again shift to the position shown in FIGURES 3 and 4 so as to deenergize and open the valve 84 to permit the flow of fluid.

In order to indicate the cycles, the apparatus includes an indicating lamp 91 in shunt with the coil of the valve 84. The apparatus also includes a pressure gauge 92 inserted in the injection conduit to indicate pressure. It will be understood that when the electrical valve 84 is closed, it simply blocks the flow of fluid from the embalming machine, such that the machine provides a pulsating flow as the valve is alternately closed and opened.

The apparatus shown diagrammatically in FIGURE 6 illustrates a second hook-up for converting a conventional embalming machine, as previously indicated at 75, to back pressure embalming. In this arrangement, the back pressure switch 80 is arranged to shut down the entire machine instead of closing off the injection conduit.

As shown in FIGURE 6, the embalming machine is powered by the lines 93 and 94. An electrical relay 95 includes a normally closed contactor 96 inserted in the power line 94, thus completing the circuit to the embalming machine. One side of the relay coil is connected to the power line 94 through line 97, and the circuit is completed by way of branch line 98 to the second power line 93. The pole 83 of the back pressure switch is inserted in the branch line 98 so as to control the operation of the relay.

When the back pressure in the injection conduit 76 is below the setting of the back pressure switch, the switch pole 83 resides in the position shown in FIGURE 6, with the relay 95 deenergized. When the back pressure rises to its maximum value, as determined by switch 80, the pole 83 snaps to its second position, thus closing the circuit to the coil of relay 95, causing its contactor 96 to open the circuit to the embalming machine. When the machine thus is deenergized, its pump is decommissioned, and the back pressure in the conduit gradually drops until the back pressure switch is tripped as its lower pressure setting to deenergize the relay coil, causing the machine to resume operation. The alternate opening and closing of the relay contact creates a pulsating delivery, the frequency of which is determined by the rate of dissipation of embalming solution. In order to provide an indication of the rate of pulsation, an indicator lamp 100 is connected in shunt with the coil of relay 95.

Modified Back Pressure Switch

The back pressure switch 80 shown in FIGURE 4 is generally similar to the switch previously described with reference to FIGURES 1 and 2, except that there is provided an individual adjustment for the high pressure and low pressure setting of the switch, combined with a toggle type switch mechanism. This arrangement provides a relatively high differential between the low and high back pressure settings.

Referring to FIGURES 4 and 5, the switch 80 comprises a frame having mounting plates 101—101 held in spaced relationship by spacer rods 102. The switch assembly is attached to the panel 50 of the embalming machine by means of the brackets 103. A bellows 104 has its lower end connected to the mounting plate 101, and the conduit 81, which communicates with the injection conduit, passes through the plate into communication with the bellows.

The high pressure adjustment comprises a plug 105 threaded through the mounting plate 101, having a knurled head 106 for adjustment purposes. A coil spring 107 is disposed between the head 108 of the bellows and the end of the threaded plug 105. The plug may be locked in an adjusted position by the locking screw 110.

The low pressure adjustment is provided by a stud 111, which is threaded through the plug 105, having a knurled head 112 at its outer end. A low pressure compression spring 113 is disposed between the inner end of the stud 111 and the head 108 of the bellows.

The switch assembly is shown at its low pressure position in FIGURE 4, under control of the low pressure spring 113. In this position, clearance as indicated at 114, exists between the high pressure spring and its adjusting plug 105. As pressure builds up, the clearance 114 is taken up, then the bellows compresses the high pressure spring 107 until the upper limit snaps the toggle switch to second position, as shown in FIGURE 5.

The toggle pole 83 is enclosed within an insulated casing 115 attached to the mounting plates 101 of the bellows cage. In the low pressure position shown in FIGURE 4 (which corresponds with FIGURES 3 and 6), the pole 83 resides against a contact 116. The pole is pivotally mounted as at 117 and includes a toggle spring 118 in compression between the pole and casing 115, the toggle spring being adapted to snap the pole toward the contact 87 or to the stop pin 116 by toggle action after the pole is forced in either direction beyond a dead center position. The branch lines previously described with reference to FIGURES 3 and 6 are connected to the pole 83 and to the contact 87.

The pole 83 includes an actuating limb 120 which trips the pole in response to expansion or contraction of the bellows 104. For this purpose, the head of the bellows is provided with a yoke 121 having opposed adjustment screws 122—122 engageable with the end portion of actuating arm 120. As the pressure rises above the low pressure value, the bellows begins to expand, as indicated by the arrow (FIGURE 5) causing the lower adjustment screw 122 to shift arm 120 upwardly toward switch closing position. As the arm 120 reaches the approximate position indicated by the broken lines in FIGURE 5, beyond the dead center position, the toggle spring 118 snaps the switch pole to its second position (FIGURE 5), thus completing the circuit through the switch to shut off the embalming pressure. As back pressure decreases, the upper adjustment screw 122 contacts arm 120, causing the pole to snap in toggle fashion back to the open position of FIGURE 4. The high and low compression springs 107 and 113, in conjunction with the switch adjusting screws 122, permit the apparatus to be set to provide any required differential, within limits, between maximum and minimum back pressures.

Having described my invention, I claim:

1. In an embalming apparatus comprising, a water reservoir, a concentrate reservoir, a closed mixing tank, respective supply systems for conducting water and concentrate at predetermined pressure and rates of flow from the concentrate reservoir and water reservoir to the mixing tank, respective electrically operated supply valves in each of said supply systems operable to regulate the flow of water and concentrate to the mixing tank, a pressure responsive switch in fluid communication with the mixing tank and adapted to be operated in response to the pressure developed by the water and concentrate introduced into the mixing tank, an injection conduit interconnected to said mixing tank for delivering the solution from the mixing tank to the circulatory system of a body, an electrically operated discharge valve interposed in the injection conduit, the respective supply and discharge valves being interconnected electrically with the said pressure responsive switch, said pressure responsive switch being effective to energize and thereby open the supply valves and to deenergize and thereby close the discharge valve when the solution of water and concentrate in the mixing tank is at a predetermined minimum pressure and to open the discharge valve and close the supply valves when the pressure of the solution in the mixing tank is at a predetermined maximum pressure, thereby to provide a pulsating discharge of solution from the mixing tank to the injection conduit, the improvement which comprises a back pressure device in fluid communication with the injection conduit, and an electrical back pressure control switch associated with the said back pressure device, said electrical back pressure switch being in circuit controlling relationship with the supply valves and being opened to prevent reenergization of said supply valves, whenever the back pressure in the injection conduit rises to a predetermined maximum pressure.

2. In an embalming apparatus comprising, a water reservoir, a concentrate reservoir, a closed mixing tank, respective supply systems for conducting water and concentrate at predetermined pressure and rates of flow from the concentrate reservoir and water reservoir to the mixing tank, respective electrically operated supply valves in each of said supply systems operable to regulate the flow of water and concentrate to the mixing tank, a pressure responsive switch in fluid communication with the mixing tank and adapted to be operated in response to the pressure developed by the water and concentrate introduced into the mixing tank, an injection conduit interconnected to said mixing tank for delivering the solution from the mixing tank to the circulatory system of a body, an electrically operated discharge valve interposed in the injection conduit, the respective supply and discharge valves being interconnected electrically with the said pressure responsive switch, said pressure responsive switch being effective to energize and thereby open the supply valves and to deenergize and thereby close the discharge valve when the solution of water and concentrate in the mixing tank is at a predetermined minimum pressure and to open the discharge valve and close the supply valves when the pressure of the solution in the mixing tank is at a predetermined maximum pressure, thereby to provide a pulsating discharge of solution from the mixing tank to the injection conduit, the improvement which comprises a back pressure device in fluid communication with the injection conduit, and an electrical back pressure control switch associated with the said back pressure device, said electrical back pressure switch being in circuit controlling relationship with the supply valves and being opened to prevent reenergization of said supply valves, whenever the back pressure in the injection conduit rises to a predetermined maximum pressure, said back pressure switch being closed when said back pressure drops to a predetermined minimum pressure substantially below said maximum pressure.

References Cited in the file of this patent

UNITED STATES PATENTS

| | | |
|---|---|---|
| 1,964,924 | Metcalf | July 3, 1934 |
| 2,432,312 | Hasselhorn | Dec. 9, 1947 |
| 2,462,617 | Eckels | Feb. 22, 1949 |
| 2,545,056 | Taylor | Mar. 13, 1951 |
| 2,626,446 | Moore | Jan. 27, 1953 |
| 2,874,714 | Pellerin et al. | Feb. 24, 1959 |